United States Patent Office 3,531,763
Patented Sept. 29, 1970

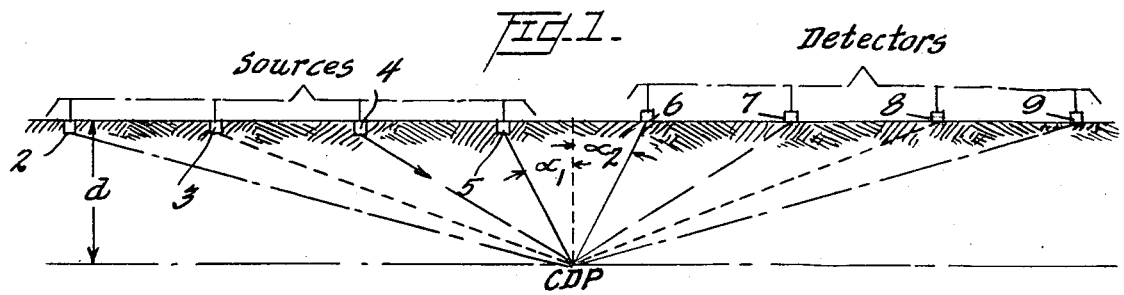
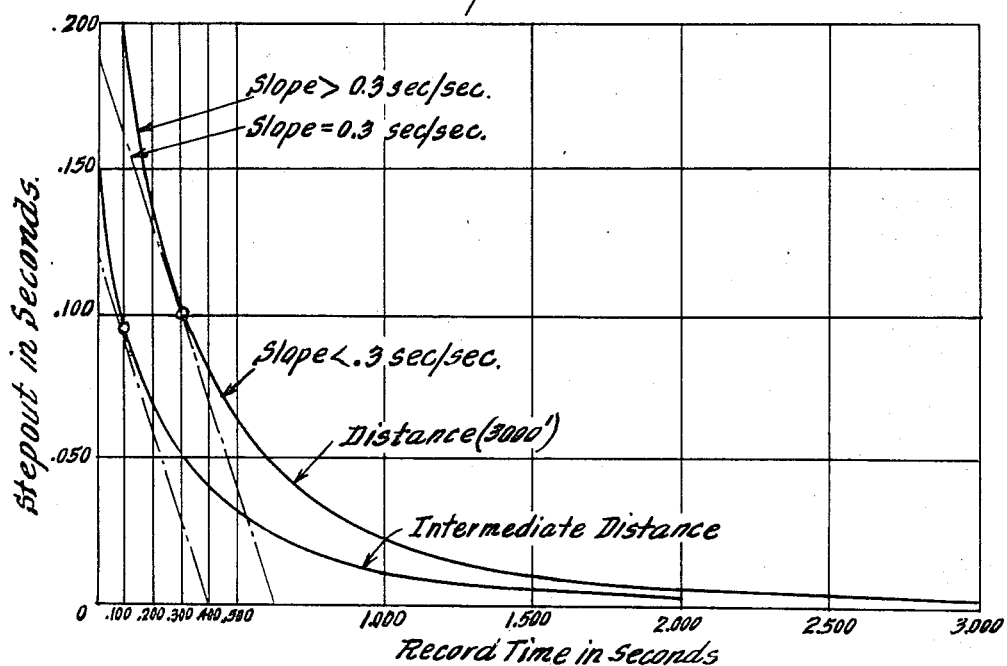
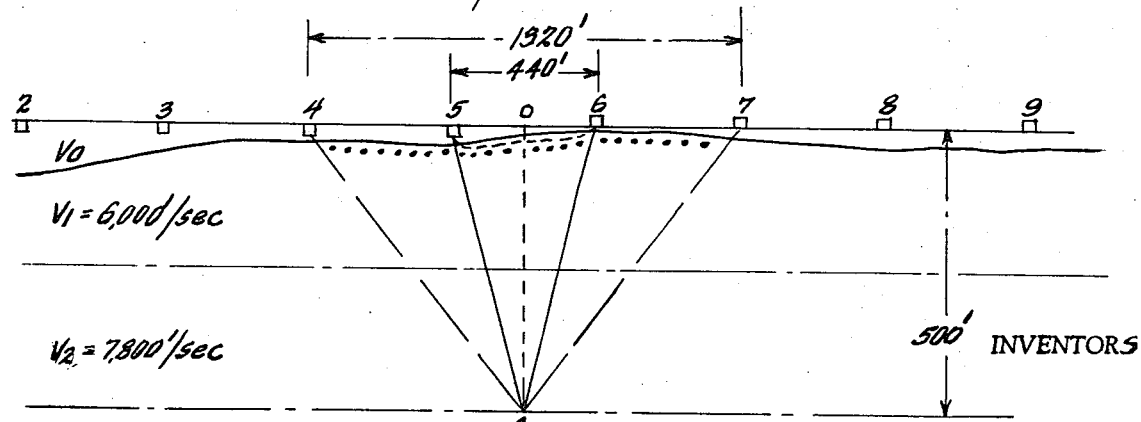

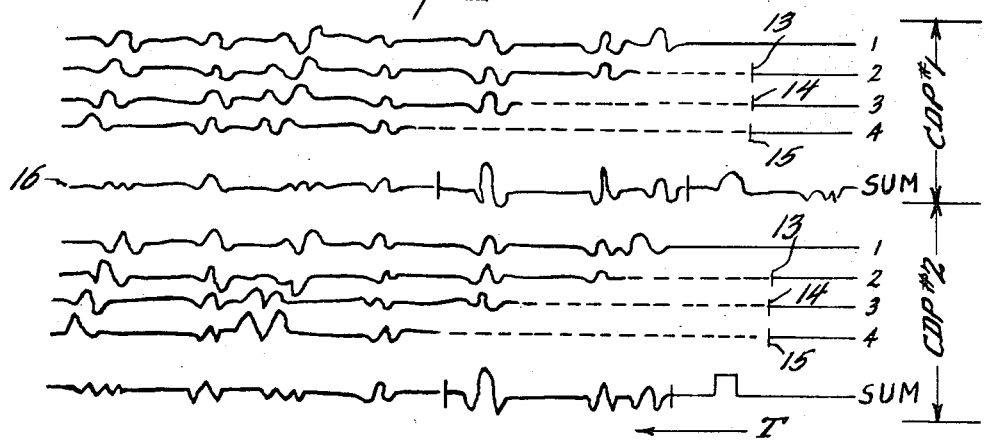
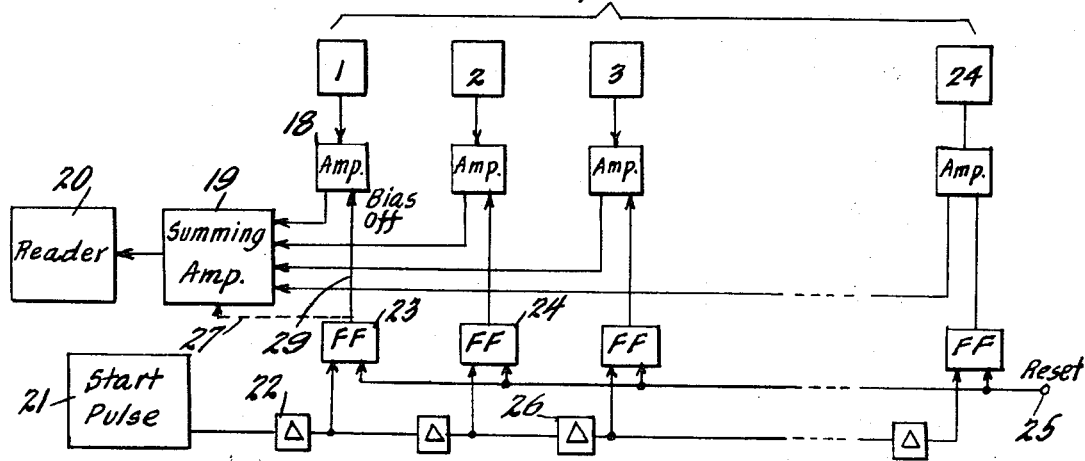
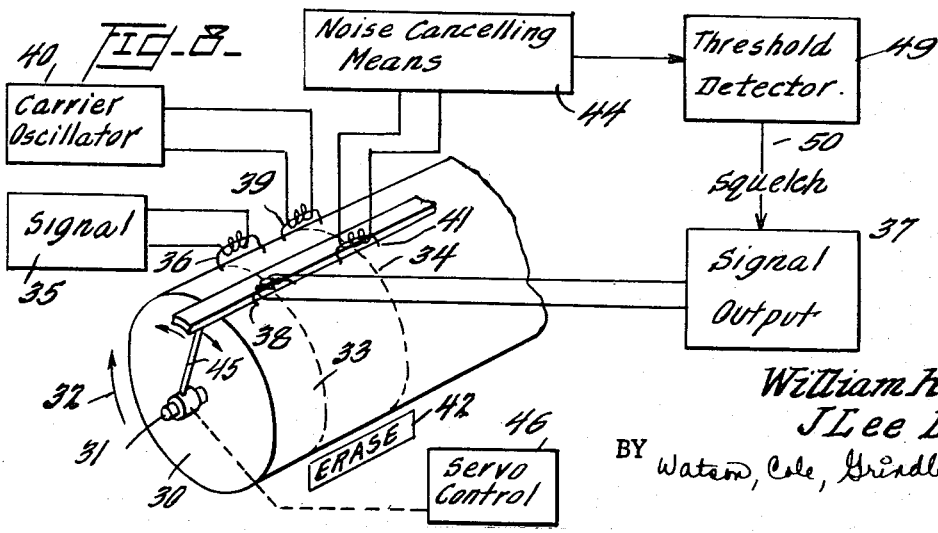

3,531,763
RESTRICTED STACKING ON SHALLOW
REFLECTIONS
William H. Mayne, San Antonio, and JLee Davis, Dallas,
Tex., assignors, by mesne assignments, to Atlantic Richfield Company, New York, N.Y., a corporation of Pennsylvania
Filed June 2, 1965, Ser. No. 460,659
Int. Cl. G01v 1/32, 1/36
U.S. Cl. 340—15.5                            2 Claims This invention relates to methods of seismic surveying which locates a series of seismic signal sources at spaced distances and respective detectors at locations which provide reflections from a reflective boundary at a common depth point. More particularly the invention relates to methods of providing improved signals with less distortion from moveout and other noise effects occurring in shallow reflections.

It is desirable in seismic surveying to provide for variations in moveout encountered in signals reaching various detectors from a common depth point. Also, significant variations in velocity, for example, are encountered in the low velocity zone near the surface of the earth. Shallow reflections are considered to be reflections from boundaries at a depth of less than or in the order of one-half the distance from the source to the detector. Thus the present invention is directed to the manner of correction of signals produced from shallow reflections in order to reduce various kinds of distortion.

Moveout distortion becomes a significant distortion factor in shallow reflections where a large rate of change in moveout is encountered. Reflections, as would be received by a detector adjacent to the source, are commonly used as a reference in stacking (even though a detector may not be at this location). Reflections, as received by a detector remote from the source, are converted to the time for the corresponding reflections as would be received by a detector adjacent to the source. This correction is a time shift of the signal and is equal to the moveout function.

However, some seismic equipment cannot conveniently provide the necessary time shifts to attain corrections in this manner, and in accordance with the present invention, selected signals may be squelched for limited time periods after the seismic shot to prevent introducing signals with inadequate moveout.

It is therefore one of the objects of the present invention to reduce signal distortions due to large rates of change in moveout.

A more specific object of the invention is to squelch selected signals with inadequate moveout for a limited time after a seismic shot to prevent distortion from shallow reflections.

A further major source of distortion may be introduced where large variations exist in near surface velocities. This can be complicated by variations of the thickness of the surface layer. In addition interference can result from seismic energy travelling through alternative paths such as refractions, shear waves and other disturbing seismic energy. A further source of distortion can result from a change in the common depth point when shallow boundaries have steep dip.

It is a further object of the invention to improve signals obtained in seismic surveying by eliminating the adverse effects of distortion introduced by the foregoing phenomena.

It is a general object of the invention to provide improved methods of obtaining accurate signals representing conditions encountered in shallow reflections.

Thus in accordance with the present invention improved methods of seismic surveying are provided by producing the plurality of signals through corresponding signal paths of various lengths and selectively squelching signals in various selected paths which have excessive noise components superimposed thereupon. The signals of the various paths are then added together or combined to provide a sum signal, which is known as a stacked signal, where the stacking is restricted by elimination of certain of the signal paths in the shallow reflection regions.

One manner of restricting the stacking on shallow reflections is to choose arbitarary functions of time and selectively squelch signal channels during periods of time progressively increasing as the function of the spread of the detectors away from the common depth point. Thus as the moveout increases, the length of time increases before the signals from the corresponding detectors are added to the stacked or summed signal. The squelching of the various signal channels can take place thus with an arbitrary function of time depending upon the distance of the paths or the spread between the various detectors.

Alternatively, other functions may be programmed to vary the time at which each remote signal channel is squelched depending upon the velocity or the amount of distorting noises in a signal channel. For example, signal channels may be squelched as long as the noise components exceed a certain threshold value. In this manner, the restricted stacking of the various signal channels for areas having shallow reflections will provide improved signals and eliminate a considerable number of the noise components otherwise introduced.

The techniques of the present invention are set forth in greater detail with reference to the accompanying drawings, wherein:

FIG. 1 is a schematic diagram indicating a plurality of seismic sources and detectors distributed to receive signals reflected from a common depth point at a boundary surface which follow paths of varying distances;

FIG. 2 is a graph showing movement curves for various maximum distances together with slope lines indicating the rate of variation of step out;

FIG. 3 is a diagram indicating the effects of a change of velocity of travel of seismic rays in shallow regions near the earth's surface;

FIG. 6 is a waveform chart indicating the manner of stacking seismic signals in accordance with the methods introduced by this invention;

FIG. 7 is a block diagram of a recording system constructed in accordance with the principles of this invention; and FIG. 8 is a diagrammatic view and block system diagram of a seismic recording system which provides for a different system embodiment operating under the methods provided in accordance with this invention.

Figure 4:
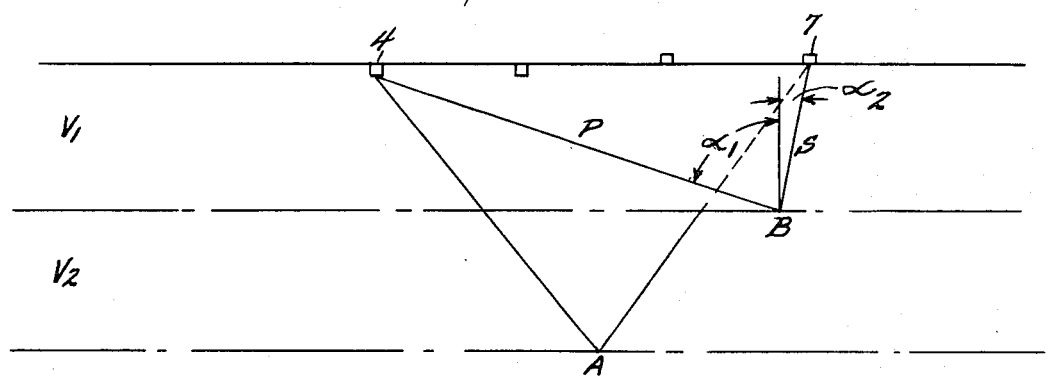
FIG. 4 is a diagram indicating the effect of shear waves introducing noise components in seismic signals.

The diagram of FIG. 1 is useful in demonstrating the moveout phenomena. Here various sources 2, 3, 4 and 5 are placed at positions for shots or impacts commonly used as a signal source in seismic surveying. Each of these source positions corresponds through a defined path through the common depth point CDP with a detector spaced in an array 6, 7, 8 and 9. Thus the signal path from source 5 travels to the common depth point CDP and back to the initial detector position 6 defining the angle of incidence $\alpha_1$ and the reflection angle $\alpha_2$ as related from the signal path to the center line perpendicular from the common depth point. Each signal path is of corresponding greater length as may be seen by tracing the signal path 4–CDP–7 etc.

The depth $d$ to the boundary layer may be of variable distance. However we may choose arbitrarily a depth of 10 units and a spacing between the sources and detectors of 10 units and therefore the distances of the various paths and the movement relationships are shown in the following chart:

[SPACING BETWEEN UNITS=10]

| Path | Depth=10 Distance | Distance of moveout | Moveout distance change from depth=0 to depth=10 | Depth=0, distance of moveout |
|---|---|---|---|---|
| 0-CDP-0 | 20.0 | 0 | 0 | 0 |
| 5-CDP-6 | 22.3 | 2.3 | 7.7 | 10 |
| 4-CDP-7 | 36.0 | 16.0 | 14.0 | 30 |
| 3-DDP-8 | 54.0 | 34.0 | 16.0 | 50 |
| 2-CDP-9 | 72.8 | 52.8 | 17.2 | 70 |

Depending upon the equipment used conventionally in seismic surveying of this type, the rate of change of moveout may be in the order of one second per second or less. As shown in the graph of FIG. 2, curves are plotted for typical field conditions for a maximum distance of 3,000 feet for the spread length and another curve for an intermediate distance in the spread length. The rate of change of the moveout represented by these curves is indicated by the slope of the curves. The slope is .3 second per second at the points indicated by the circles and the tangents to the curves. It will be seen on these curves that the slope is greater than .3 second per second at the upper portions of the curve which represents the initial period of the record time in seconds as shown on the abscissa, whereas for greater time periods of recording time the slope indicates a moveout of less than .3 second per second.

We may assume in connection with FIG. 2 that the distortion when the moveout rate is greater than .3 second per second introduces too much signal distortion and therefore the signal in any such channels should be squelched until such a time that the record time exceeds the position on the curve at which the slope becomes less than .3 second per second. In this manner a slope or change in moveout detector can be used for automatically providing a squelching signal to each channel amplifier, as will later be discussed in connection with FIG. 8.

This change (.3 unit per unit path) occurs when $\alpha_1$ and $\alpha_2$ are in the order of 45 degrees and is about the limit that can be tolerated. This will furnish an estimate as to the extent that this squelch is needed. For example, if the geophone is two miles from the source, reflections from horizons less than about one mile deep would be seriously distorted. This invention will squelch or block the signal from these detectors until the reflections are being received from a depth of greater than the order of one mile, then the signal would be combined with that from closer detectors, according to the usual stacking procedures.

As may be seen from FIG. 3, a change of velocity in the various layers from $V_0$ to $V_1$ to $V_2$ will have an effect upon the separation or overlap of reflected signals by distorting signals. Thus assuming a velocity of 6,000 feet per second for $V_1$ and a distance of 440 feet between source 5 and detector 6 and a corresponding length of 1,320 feet between source 4 and detector 7 from the common depth point A, the relationship of signal path lengths can be computed while assuming a depth of 500 feet to the boundary layer containing the common depth point A. With these velocities and distances we can derive approximate travel time of the seismic signals through various paths as shown in the following chart:

| Path | Length | Time | |
|---|---|---|---|
| 5 to A to 6 | 1,092' | .145 second | } Note separation. |
| 5 to 6 (dash) | 440' | .073 second | |
| 4 to A to 7 | 1,656' | .072 second .220 second | } Note overlap. |
| 4 to 7 (dotted) | 1,320' | .220 second 0 second | |

From this chart it may be seen that the direct energy transmitted through layer $V_1$ from source 4 to detector 7 as shown by the dotted line would overlap with the signal traveling from source 4 through the signal path in the regions $V_1$, $V_2$ to point A and back through regions $V_2$, $V_1$ to point 7. This would obviously introduce a distorted signal level because of accumulation of events whereas the corresponding times from the source 5 to detector 6 would provide enough separation that the signal could be distinguished from the noise. It is seen therefore from this figure that the squelching or depression of signal channel 4 A 7 during the stacking operation of summing all the signals would significantly improve the results.

As may be seen from FIG. 4 further distortions may be introduced by a shear wave path when it exists. The travel time for the shear wave velocity is much slower than the travel time for a compressional wave. As may be seen from the path P–S extending from 4 through B to 7, the relationship $$\frac{\alpha_1}{\alpha_2} = \frac{V_1 \text{ of the compressional wave}}{V_s \text{ of the shear wave}}$$

which gives a relationship equal to $$\frac{1}{0.4 \text{ to } 0.6}$$

Since $V_2$ is greater than $V_1$ and $V_1$ is very much greater than $V_S$, the travel time for path 4 through B to 7 can be equal to the travel time for path 4 through A to 7 and therefore introduce distortion which likewise can be eliminated by suppression of the signal path channel whenever the noise exceeds a predetermined amount.

Figure 5:
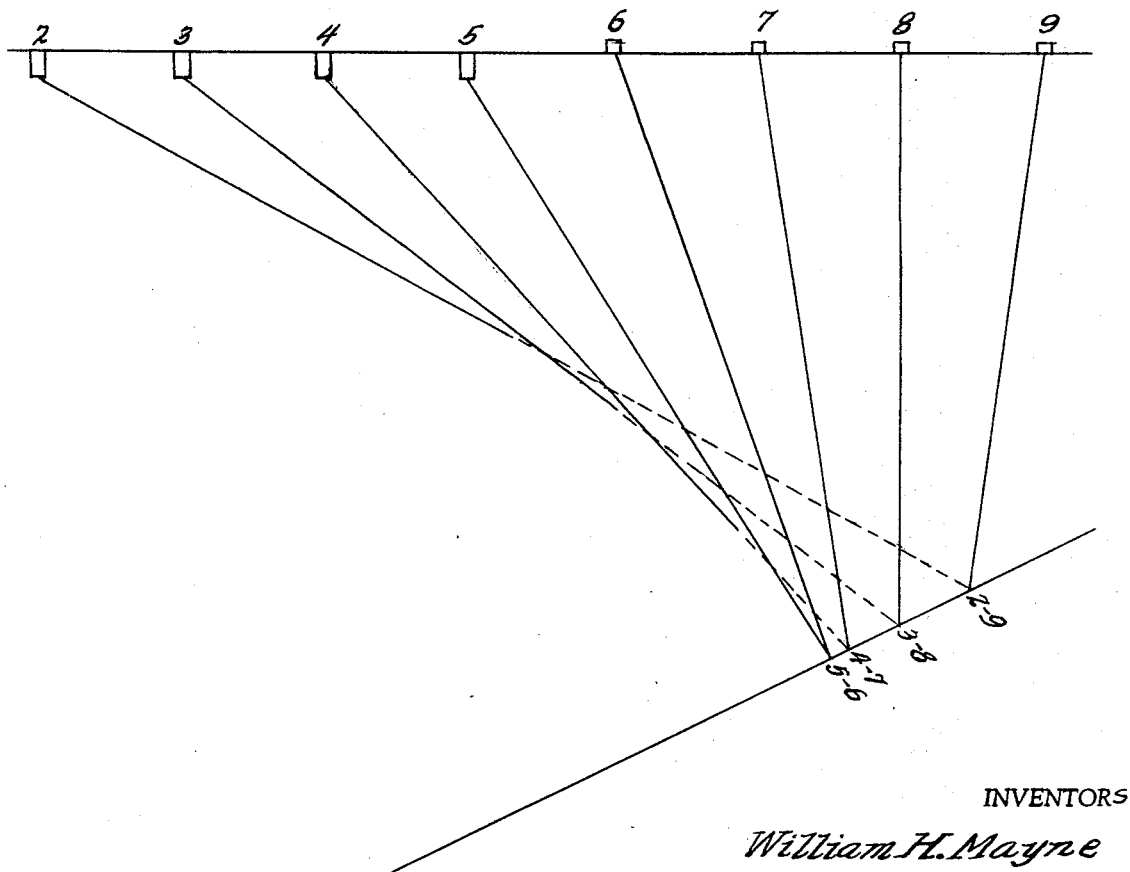
FIG. 5 is a schematic diagram of a slanting boundary surface which typifies the introduction of noise components in the seismic signal paths by this sort of subterranean structure.

Further distortions may be introduced by a sloping or dipping boundary as illustrated in FIG. 5. Although this technique certainly involves reflections from a common depth point in the general sense, the common depth point actually changes as may be seen by analyzing the trace paths from source 5 to detector 6, source 4 to detector 7 and so forth. Because of the shifting of the common depth point in this type of boundary, the path lengths may vary in much the same manner as for moveout and this is also correctible in accordance with the methods introduced by the present invention.

The effect of stacking information reflected from a common depth point as represented by signals in a plurality of different channels, as practiced by this invention, is illustrated in connection with the traces shown in FIG. 6. Conventionally the trace summing all the various channels 1, 2, 3, 4, etc., of the common depth point CDP#1 combines the complete traces of the channels. However in accordance with the teachings of this invention, it may be seen that portions 13, 14 and 15 of the traces are squelched during the initial time periods so that channel 1 has an entire trace reproduced, channel 2 has a portion 13 removed by squelching, and channels 3 and 4 have exceedingly greater portions 14 and 15 removed as the moveout increases from one signal channel to the next.

Upon analyzing the signal waves thus reproduced by stacking or summing all of the signal channels as shown in the sum signal 16, the signal waves are improved and distortion due to various sorts of reflected and refracted signals with resulting noise and interference are reduced considerably so that a much more accurate portrayal of shallow reflections is shown by the restricted stacking technique which results in an improved summation signal.

This manner of progressively increasing the time of squelching for each of the channels as the moveout increases may be accomplished with the system somewhat as shown in FIG. 7. In this system, the various reproduction devices 1, 2 and 3, etc. to 24 are shown for corresponding signal channels from a corrected reproducible record (such as a magnetic tape). Thus each lead into a corresponding amplifier 18. Each of these amplifiers in turn may be introduced into a summing amplifier 19 and subsequently a recording of the sum trace may be reproduced in recorder 20. It is to be recognized that this diagram is schematic to some extent since various methods may be used in the summing and reproduction of the various signals, but this simultaneous reproduction is exemplary of the stacking devices used in the art.

As provided by this invention, means are provided for squelching or biasing off the amplifier in each channel as indicated by lead 29. The bias is provided through flip-flop circuits 23, etc. as actuated by delay line 22, etc. Thus the bias period varies from trace to trace and progresses from either none or a short period in channel 1 to a longer period in each succeeding channel. Thus, a start pulse is introduced at the beginning of a trace as outlined in FIG. 6 for example. This start pulse produced in block 21 has passed through delay line 22 so that at some appropriate time period later flip-flop circuit 23 is actuated to unblock channel 1. All the flip-flops 23, 24, etc. are initially reset at reset lead 25 so that the corresponding amplifiers are biased off, and when the start pulse is received by way of delay line 22, 26, etc. at the corresponding flip-flops, it serves to turn the amplifier channel on. Thus depending upon the arbitrary delay time set in the various delay means 22 through 26 the channels 1, 2, 3, etc. will progressively be switched into the summing amplifier circuit 19 to accomplish the restricting of stacking afforded in accordance with the teachings of this invention.

It may be pointed out that delay periods 22, 26, etc. may be chosen as a function of the spread distances of the detectors in any array used so that the timing relationship is purely not arbitrary but has a definite relationship with the moveout function actually encountered.

It may be noted that further controls by way of leads 27 from the squelch circuits may be inserted at the summing amplifier 19 serving to keep the total power of the system constant by increasing the gain of the active traces by the amount lost due to the squelch. For example, if half the signals are squelched, the remaining signal power is increased enough to provide the same total output that would exist if the squelch did not appear.

In connection with another mode of operation exemplified by FIG. 8, the restricted stacking of a channel can take place when the noise level in a channel exceeds a predetermined threshold level. As hereinbefore described, a moveout rate of .3 second per second is a typical threshold value. Thus, consider the single channel configuration of FIG. 8 in this mode of application.

A magnetic drum 30 is rotated about axis 31 in the direction of arrow 32. A signal track 33 and a noise track 34 is provided on the drum surface between respective recording and reproducing heads. Frequency modulated seismic signals derived in block 35 are recorded by magnetic head 36 and are reproduced in signal output means 37 after the delay period during which the drum surface passes to reproducing head 38. Similarly in the noise channel 34, the recording head 39 produces a steady carrier signal from an oscillator in block 40, which is picked up in reproducing head 41. Both tracks are erased by erase head means 42 after reproduction to present clean tracks for new signals.

Conventionally the noise channel 34 is coupled to noise cancelling means 44 which derives a correction signal to be added to the signal input to block 37. The noise correction signal is derived from the modulation of the recorded carrier in track 34 as the heads 38 and 41 are rotated about the surface by means of pivot arm 45 operated by servo-control means 46, such as defined in U.S. Pat. 3,075,172, issued Jan. 22, 1963 to G. B. Loper et al., which serves to indicate the rate of change of moveout.

In accordance with this invention, however, a threshold detector 49 is used to detect whether the rate of change of moveout exceeds the desired level, and is so it squelches both the noise cancelling voltage and the signal output channel 37 by way of lead 50. In this manner the various channels may be restricted during stacking or summing to exclude those channels producing excessive noise.

It is clear therefore that the present invention provides novel methods of improving seismic signals, as defined with particularity in the following claims.

What is claimed is:
1. A method of seismic surveying comprising the steps of, locating a series of seismic sources and a series of seismic detectors in spaced relationship to produce a plurality of seismic signal channel paths of progressively greater lengths, the paths from respective ones of said sources passing to corresponding ones of said detectors by way of a common region of a reflective boundary, modifying the seismic signals in each of the channels corresponding to said paths passing through a common reflective region by eliminating from each signal only that initial time portion during which the rate of change of moveout with time exceeds a maximum preselected value, and combining the modified signals to produce a summation signal.

2. The method defined in claim 1 including the steps of deriving the rate of change of moveout with time for signals detected for each of said paths passing through a common reflective region, wherein said step of modifying the signals is controlled responsive to a threshold value which corresponds to said maximum preselected value of the rate of change of moveout with time.

References Cited
UNITED STATES PATENTS

| | | | |
|---|---|---|---|
| 2,003,780 | 6/1935 | Born | 181—.5 |
| 2,330,216 | 9/1943 | Hoover et al. | 181—.5 X |
| 2,378,925 | 6/1945 | Hoskins et al. | |
| 2,732,906 | 1/1956 | Mayne | 181—.5 |
| 3,048,817 | 8/1962 | Greening | 340—15.5 |
| 2,897,476 | 7/1959 | Widess | 340—15.5 |
| 3,217,828 | 11/1965 | Mendenhall et al. | 181—.5 |

RODNEY D. BENNETT, JR., Primary Examiner

M. F. HUBLER, Assistant Examiner